United States Patent [19]
Gohman et al.

[11] Patent Number: 5,710,668
[45] Date of Patent: Jan. 20, 1998

[54] MULTI-COLOR HEAD-UP DISPLAY SYSTEM

[75] Inventors: Jeffrey A. Gohman, Hillsboro; Robert D. Brown, Portland; Robert B. Wood, Beaverton, all of Oreg.

[73] Assignee: Flight Dynamics, Portland, Oreg.

[21] Appl. No.: 451,301

[22] Filed: May 26, 1995

[51] Int. Cl.$^6$ .......................... G02B 17/18; G02B 5/28; G02B 27/02
[52] U.S. Cl. .......................... 359/634; 359/631; 359/732; 359/727; 359/721; 359/581; 359/589; 359/583
[58] Field of Search .......................... 359/634, 631, 359/630, 732, 727, 364, 16, 721, 581, 584, 589, 583

[56] References Cited

U.S. PATENT DOCUMENTS

| | | | |
|---|---|---|---|
| 3,858,046 | 12/1974 | Cubalchini | 359/727 |
| 4,541,688 | 9/1985 | Watt et al. | 350/171 |
| 4,560,233 | 12/1985 | Banbury | 350/3.7 |
| 4,652,870 | 3/1987 | Steward | 340/705 |
| 4,711,512 | 12/1987 | Upatnieks | 350/3.7 |
| 4,832,449 | 5/1989 | Mundy et al. | 350/174 |
| 4,842,389 | 6/1989 | Wood et al. | 350/3.7 |
| 4,927,234 | 5/1990 | Banbury et al. | 350/174 |
| 4,930,847 | 6/1990 | Cederquist | 350/3.6 |
| 4,961,625 | 10/1990 | Wood et al. | 350/174 |
| 4,993,788 | 2/1991 | Steward | 350/3.72 |
| 5,282,066 | 1/1994 | Yu et al. | 359/22 |
| 5,305,124 | 4/1994 | Chern et la. | 359/13 |
| 5,475,512 | 12/1995 | Nakazawa et al. | 359/13 |

OTHER PUBLICATIONS

Ebert, J. C., "Color Holographic HUD," SID 93 Digest, Form. No. ISSN0097–0966X/93/0000–0433, 1993, pp. 433–436.

Primary Examiner—Jon W. Henry
Attorney, Agent, or Firm—Stoel Rives LLP

[57] ABSTRACT

A multi-color optical display system (10) employs a multi-powered reflective combiner (20) that together with a monochromatic or partly color-corrected relay lens (16) longitudinally corrects a multi-colored image. The combiner typically includes two surfaces (82, 90) of different optical powers with a reflective coating (106, 108) on each of the surfaces. The coatings are chosen to each reflect a specific wavelength range of colored light used in the system and to transmit all other wavelengths. The curvature of each surface is dictated by the aberrations in the color image created by the relay lens. Specifically, each surface is positioned so that its focus (86, 94) coincides with the focal point (58, 60) of the corresponding color component in an intermediate image (18) created by the relay lens so that the final virtual image (22) reflected by the combiner is longitudinally color corrected.

9 Claims, 4 Drawing Sheets

MULTI-COLOR HEAD-UP DISPLAY SYSTEM

TECHNICAL FIELD

This invention relates to vehicle head-up display ("HUD") systems and, in particular, to such a HUD system that is capable of displaying information in more than one color.

BACKGROUND OF THE INVENTION

HUD systems are currently used in aircraft to provide pilots with essential information superimposed onto their forward field of view through the aircraft windshield. The information displayed is typically data or symbolic images indicative of flight conditions, such as the operating condition of the aircraft, environmental information, or guidance information. HUD systems are also being designed for use in automobiles and other vehicles. Currently only single-color HUDs are generally available.

Typical single-color HUDs include a single-color light source, a monochromatic lens to project the light propagating from the single-color light source, and a collimator with a combiner to provide a collimated single-color final image to the viewer. When multi-colored light passes through the multiple optical lenses of the monochromatic relay lens, the different wavelengths of light are refracted to propagate along different paths to different points of focus, resulting in an unfocused image. Apochromatic relay lenses, which bring different wavelengths of light to the same focus, are prohibitively expensive to manufacture and are, therefore, impractical for use in HUD systems.

A completely focused multi-colored image display would have many advantages over a single-color display. Symbols or other information in different colors could be used in a HUD system to provide different degrees of emphasis for the information presented. A color change could be used as an emergency or warning message, an enunciator, or an indicator of, for example, mode changes or out-of-tolerance conditions. A color change could also be used to indicate that an input parameter is being updated, or that immediate action is required by the pilot.

SUMMARY OF THE INVENTION

An object of the present invention is, therefore, to provide a multi-color HUD system capable of displaying correctly focused image information in more than one color.

Another object of this invention is to provide a multi-colored HUD system implemented with an existing monochromatic lens.

A further object of the present invention is to provide such a multi-colored HUD system that is not prohibitively expensive to manufacture or install.

The present invention is a vehicle HUD system that displays information in more than one color. In a preferred embodiment for use in an aircraft, a light source emits a colored image carried by multiple wavelengths of light in response to signals generated by an image signal controller. The light rays carrying the colored image propagate through a monochromatic relay lens to create an aberrated intermediate image. This is so because the monochromatic design of the relay lens introduces longitudinal color aberrations into the different wavelengths of light passing through it. A wavelength selective combiner reflects the aberrated intermediate image toward a pilot, who views the image as it is superimposed on an outside world scene in the same field of view. The combiner is constructed to have multiple optical powers that correct for the aberrations introduced by the monochromatic relay lens and thereby presents to the pilot a correctly focused multi-colored final virtual image at or near optical infinity.

In a first preferred embodiment, the image source emits two wavelengths of light corresponding to green and red light. The combiner comprises first and second curved segments of different radii that provide two surfaces with different optical powers. The surfaces of the first and second curved segments carry respective first and second reflective coatings that correspond to different ranges of wavelengths of light emitted by the image source. The green light is reflected by the first reflective coating on the first surface, and the red light is transmitted by the first coating but reflected by the second reflective coating on the second surface. The curved segments reflect their corresponding wavelengths of light so that the wavelengths of light reflected by the reflective coatings have a focal point at or near optical infinity and are free from longitudinal color aberrations that would distort the final virtual image displayed to the pilot.

In a second preferred embodiment, a combiner comprised of two curved segments carrying three different reflective coatings provides an aberration-free three-color image. In a third preferred embodiment, a combiner comprised of three curved segments each having a surface carrying a different reflective coating provides an aberration free three-color image.

Additional objects and advantages of the present invention will be apparent from the detailed description of the preferred embodiments which proceeds with reference to the accompanying drawings.

DETAILED DESCRIPTION OF PREFERRED EMBODIMENTS

Figure 1:
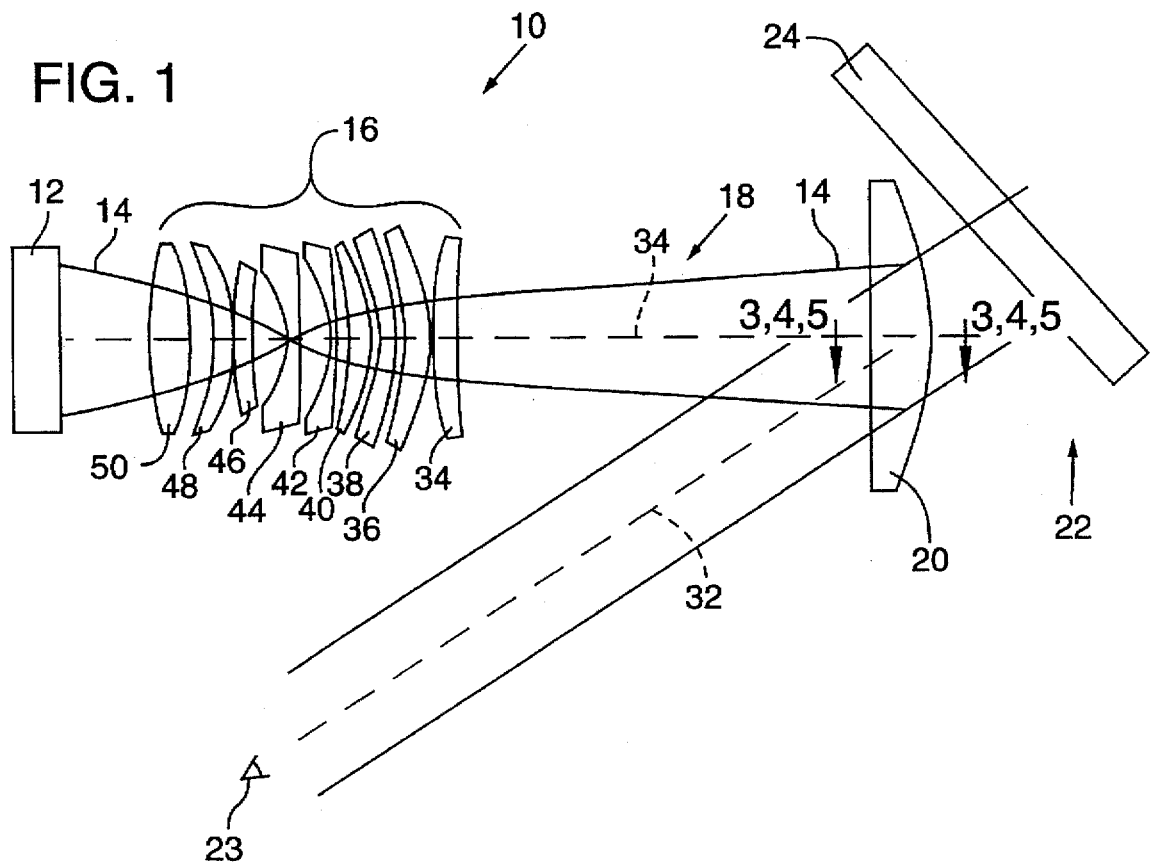
FIG. 1 is a diagram of an optical display system of the invention installed as an aircraft head-up display.
Figure 2:
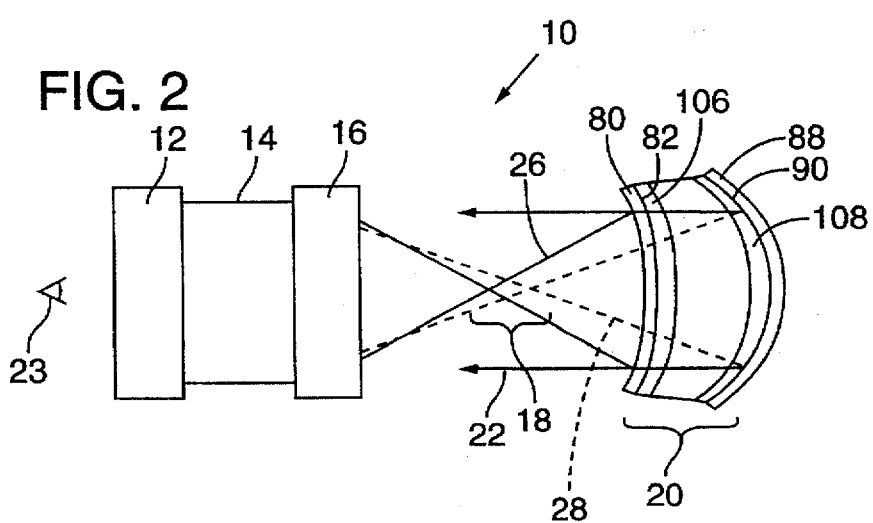
FIG. 2 is plan view of the display system of FIG. 1 with the relay lens shown in block diagram form and the combiner in enlarged detail.

FIGS. 1 and 2 show a multi-color optical head-up display ("HUD") system 10 of the present invention that is preferably installed in an aircraft. System 10 includes in image source 12 that produces a multi-colored image carried by light rays 14 that propagate through a monochromatic relay lens 16 to create an intermediate image 18 (FIG. 2). Image 18 is carried by light rays 14 that are reflected by a collimating combiner 20 to create a final image 22 (FIG. 1) that is viewed at the pilot's eye reference point 23. Combiner 20 superimposes final virtual image 22 at or near optical infinity on an outside world scene (not shown) that the pilot sees through a windshield 24.

Image source 12 is preferably a cathode-ray tube that emits a multi-colored image that includes a green component 26 (FIG. 3) carried by multiple wavelengths of light in the range of about 540–560 nanometers (nm) and a red component 28 carried by multiple wavelengths of light in the range of about 610–640 nm. In second and third embodiments (FIGS. 4 and 5), multi-colored image 14 includes a blue component 30 carried by multiple wavelengths of light in the range of about 470–500 nm. Other colors of light may also be used. Image source 12 emits the color components of multi-colored image 14 in a conventional field sequential manner so that the color components are laterally color corrected as they propagate generally along a light path 32 (indicated by dash lines) toward relay lens 16.

Figure 7:
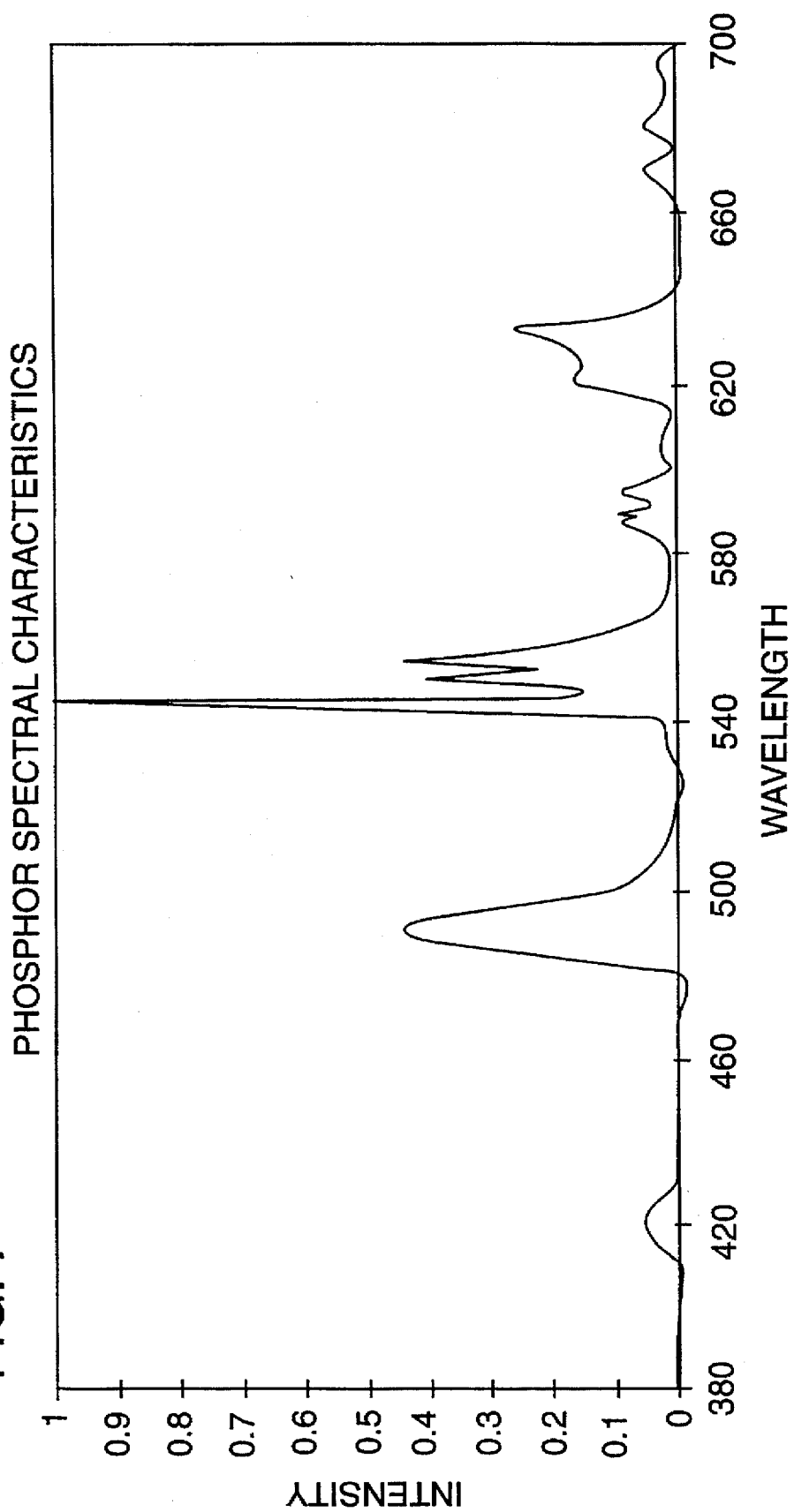
FIG. 7 is a graph showing the light emission spectral characteristics of the phosphor used in the cathode-ray tube light source of FIG. 1.

Relay lens 16 transfers the image produced by image source 12 to combiner 20. Relay lens 16 preferably is a conventional monochromatic lens array configured to transfer a single color of light having a range of wavelengths centered at about 544 nm (i.e., green light) that is typically produced by a cathode-ray tube constructed with a P43 phosphor having spectral properties similar to those shown in FIG. 7.

Monochromatic lens 16 includes between five and twelve, and typically nine, optical lens elements that cooperate to form a focused, single-color intermediate image. Lens elements 34, 36, 38, 40, 42, 44, 46, 48, and 50 each have specially configured curved surfaces and thicknesses that cooperate to bend the single-colored light as it propagates through relay lens 16. The radii of the curved surfaces and the thicknesses of the lens elements can be determined by a person sufficiently skilled to use a commercially available ray trace program such as the Code V or Super Oslo software analysis and design program.

The multiple colors of light carried by green light rays 26, red light rays 28, and blue light rays 30 emitted by light source 12 propagate through monochromatic relay lens 16 and are bent along, respectively, different light paths 52, 54, and 56 (FIG. 5) so that intermediate image 18 includes focal points 58, 60, and 62, each corresponding to a different color component. Focal points 58, 60, and 62 are not coincident with one another so that intermediate image 18 can be described as being unfocused and having longitudinal color aberrations, the latter of which is also called axial chromatic aberrations.

Intermediate image 18 is reflected and refracted by collimating combiner 20 to create final virtual image 22 (FIG. 1) that has a focal point at infinity for each wavelength of light that the pilot views from eye reference point 23. To correct the longitudinal color aberrations of intermediate image 18, combiner 20 includes multiple substrates and multiple wavelength selective reflective coatings.

Figure 3:
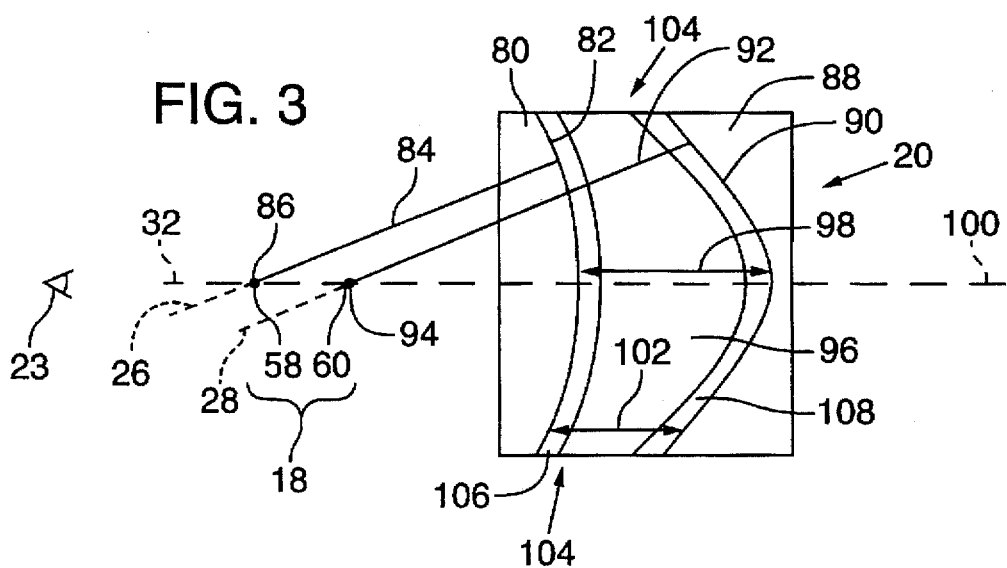
FIG. 3 is a sectional view taken along lines 3—3 of FIG. 1 showing a first embodiment of a combiner having two curved surfaces each of which provides a different optical power.

As shown in FIG. 3, a first preferred embodiment of combiner 20 includes a first substrate 80 having a rear convex curved surface 82 in the shape of a spherical segment having a radius that defines a focal length 84 of 36.30 centimeters (cm). Focal length 84 defines a focus 86 that coincides with focal point 58 of green light ray component 26 of intermediate image 18. Combiner 20 also includes a second substrate 88 having a front concave curved surface 90 in the shape of a spherical segment having a radius that defines a focal length 92 of 34.21 cm. Focal length 92 defines a focus 94 that coincides with focal point 60 of red light ray component 28 of intermediate image 18. The curved surfaces of the combiner may be of any curved shape having a focus, such as a parabolic or aspheric segment.

Substrates 80 and 88 are fabricated from BK7 glass and are cemented together by an adhesive 96 such as an optical epoxy glue. The substrates can be manufactured of other optical materials, such as plastic, and can be adhered together with other optical adhesives. The preferred adhesive has a refractive index that is the same as or similar to the refractive index of the material used to fabricate the substrates.

Because they have different radii, substrates 80 and 88 are spaced apart by a distance 98 of 500 micrometers (μm) along a center line 100 of combiner 20 and a distance 102 of 50 μm in edge regions 104 of combiner 20. Distance 98 along center line 100 is typically greater than distance 102 in edge regions 104 because focal length 92 of substrate 88 is shorter than focal length 84 of substrate 80; therefore, adhesive 96 has a uniformly decreasing thickness between substrates 80 and 88 from center line 100 outwardly toward edge regions 104.

Rear convex curved surface 82 of substrate 80 carries a wavelength selective reflective coating 106 (the thicknesses of the coatings are exaggerated in the figures for illustrative purposes) that reflects wavelengths corresponding to green light rays 26 and transmits the wavelengths of light of all other colors. Front concave curved surface 90 of substrate 88 carries a wavelength selective reflective coating 108 that reflects wavelengths corresponding to red color light rays 28 and transmits the wavelengths of light of all other colors.

Figure 6:
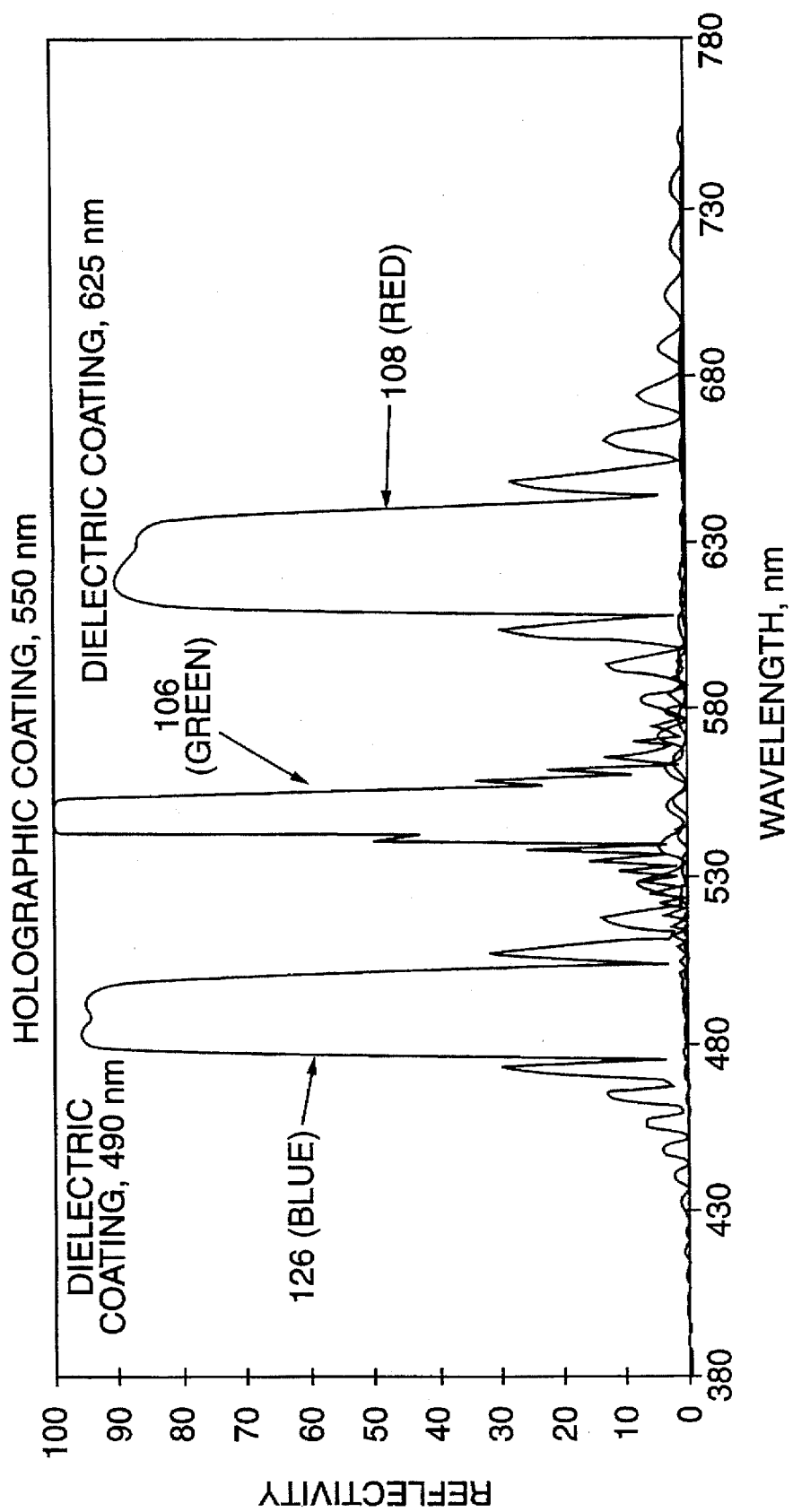
FIG. 6 is a graph showing the light reflection spectral characteristics of three types of coatings used in the preferred embodiments of the combiner shown in FIGS. 3–5.

Coating 106 is preferably a dichromated gelatin holographic recording material coated on surface 82 and having a reflectivity of approximately 100% (FIG. 6) over a 540–560 nm range, which corresponds to the wavelengths of green light rays 26. Coating 108 is preferably a dielectric coating coated on surface 90 and having a reflectivity of approximately 90% (FIG. 6) over a 610–640 nm range, which corresponds to the wavelengths of red light rays 28. The wavelength selective reflective coatings of combiner 20 may also be fabricated of thin film, photopolymer, or rugate material and may be applied by spraying, evaporating, or rolling onto the substrate surfaces.

As shown in FIG. 2, when light rays 26 and 28 propagate along light path 32 from the location of intermediate image 18 to combiner 20, coating 106 on substrate 80 reflects green light rays 26 and transmits all other light rays so that red light rays 28 propagate through coating 106 and are reflected by coating 108. Coatings 106 and 108 cooperate, therefore, with curved surfaces 82 and 90 to correct the longitudinal color aberrations of intermediate image 18 by producing final virtual image 22 that is focused at infinity, i.e., the light rays are parallel, for each of the multiple wavelengths of light. Skilled persons will appreciate that producing final virtual image 22 at near optical infinity, i.e., the light rays are nearly parallel, may adequately correct the longitudinal color aberrations.

Figure 4:
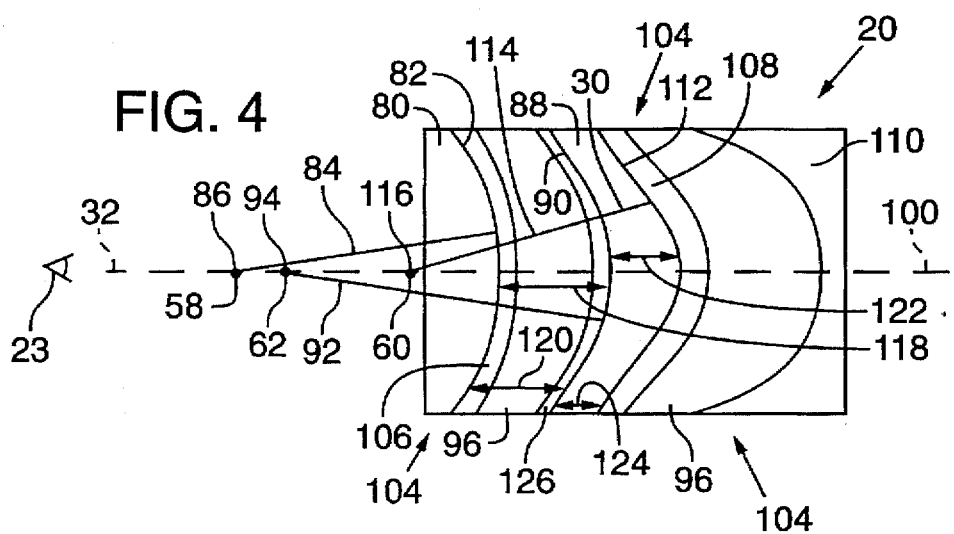
FIG. 4 is a sectional view taken along lines 4—4 of FIG. 1 showing a second embodiment of a combiner having three curved surfaces each of which provides a different optical power.

In the second embodiment shown in FIG. 4, combiner 20 includes a third substrate 110 and substrate 88 further includes a rear convex curved surface 112 in the shape of a spherical segment having a radius that defines a focal length 114 of 34.21 cm. Focal length 114 defines a focus 116 that coincides with focal point 60 of red light ray component 28. Front concave surface 90 has a radius that defines focal length 92 that defines focus 94. Focus 94 coincides with focal point 62 of blue light ray component 30 of intermediate image 18. Substrate 110 functions as an end cap and, in the second embodiment, does not reflect colored light.

Because they have different radii, curved surfaces 82 and 90 are spaced apart by a distance 118 of 50 µm along center line 100 and a distance 120 of 500 µm in edge regions 104 and curved surfaces 90 and 112 are spaced apart a distance 122 of 5 mm along center line 100 through substrate 88 and a distance 124 3.7 mm in edge regions 104. In the second embodiment, therefore, focal lengths 84, 92, and 114 define the respective focii 86, 94, and 116 that coincide with, respectively, focal point 58 of green light rays 26, focal point 62 of blue light rays 30, and focal point 60 of red light rays 28 of intermediate image 18.

Rear convex curved surface 112 of substrate 88 carries wavelength selective reflective coating 108 that reflects wavelengths corresponding to red light rays 28 and transmits all other colors of light. Front concave curved surface 90 of substrate 88 carries a wavelength selective coating 126 that reflects wavelengths corresponding to blue light rays 30 and transmits all other colors of light. Coating 126 is preferably a dielectric material having a reflectivity of approximately 95% (FIG. 6) over a 470–500 nm range, which corresponds to the wavelengths of blue light rays 30. The three wavelengths of light reflected and refracted by combiner 20 are, therefore, parallel and focused at infinity in final virtual image 22.

Still referring to the second embodiment shown in FIG. 4, substrate 88 is positioned between substrates 80 and 110 and preferably is a thin meniscus fabricated from BK7 glass. Substrate 110 is also fabricated from BK7 glass. Substrates 80, 88, and 110 preferably are cemented together by optical epoxy adhesive 96.

Figure 5:
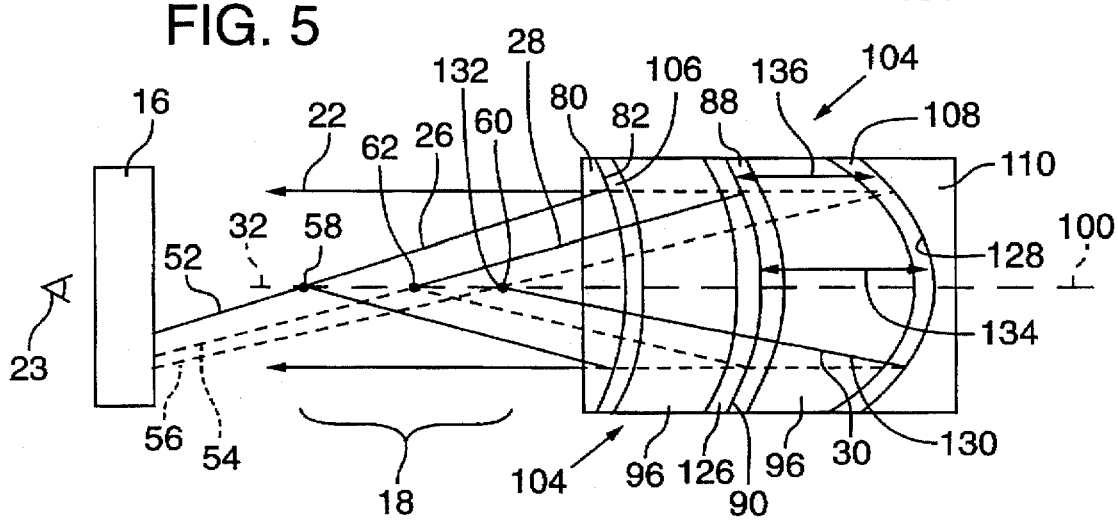
FIG. 5 is a sectional view taken along lines 5—5 of FIG. 1 showing a third embodiment of a combiner having three curved surfaces each of which provides a different optical power.

In the third preferred embodiment shown in FIG. 5, combiner 20 includes first substrate 80 having rear convex curved surface 82 carrying reflective coating 106 that reflects green light rays 26 and second substrate 88 having front concave curved surface 90 that carries reflective coating 126 that reflects blue light rays 30. Combiner 20 further includes third substrate 110 having a front concave curved surface 128 in the shape of a spherical segment having a radius that defines a focal length 130 of 34.21 cm. Focal length 130 defines a focus 132 that coincides with focal point 60 of red light ray component 28 in intermediate image 18. Because they have different radii, substrates 88 and 110 are spaced apart by a distance 134 of 700 µm along center line 100 and a distance 136 of 50 µm in edge regions 104 of combiner 20.

Front concave curved surface 128 of substrate 110 carries wavelength selective reflective coating 108 that reflects wavelengths corresponding to red light rays 28 and transmits all other colors of light. The three wavelengths of light reflected and refracted by combiner 20 are, therefore, parallel and focused at infinity in final image 22.

Multi-color HUD system 10 includes, therefore, multi-powered optical combiner 20 that corrects longitudinal color aberrations of intermediate image 18 introduced by monochromatic relay lens 16. System 10 presents to the pilot a correctly collimated multi-colored final virtual image 22 that has a focal point at infinity and is superimposed on an outside world view.

It will be obvious to those having skill in the art that many changes may be made to the details of the above-described embodiments and method of this invention without departing from the underlying principles thereof. For example, although lens 16 is of monochromatic design, a partly color-corrected lens could be substituted for lens 16 as part of an optimized overall optical system design. The scope of the present invention should, therefore, be determined only by the following claims.

We claim:

1. A multi-color optical display system for producing longitudinally color-corrected multi-colored images and presenting them for observation in combination with an observer's visual exterior view of an outside world scene, comprising:

an image source providing a multi-colored image carried by multiple wavelengths of light propagating along an optical path;

an optical combiner positioned so that an observer can see the exterior view through it and so that at least some of the multiple wavelengths of light reflect off the combiner to provide an image for observation by the observer;

a lens positioned along the optical path between the combiner and the image source but out of the observer's direct exterior view, the lens receiving the multi-colored image, producing an intermediate image, and introducing longitudinal color aberrations into the multiple wavelengths of light as they propagate through the lens; and the combiner receiving the multiple wavelengths of light propagating from the lens, the combiner including multiple substrates having curved surfaces of different shapes and carrying reflective coatings of different wavelength selective properties so that the substrates cooperate to reflect the multiple wavelengths of light propagating from the lens to present to the observer a multi-colored final image superimposed on the outside world scene and substantially free from longitudinal color aberrations.

2. The system of claim 1 in which the reflective coatings are transmissive to selected ranges of the multiple wavelengths of light.

3. The system of claim 1 in which substantially all the wavelengths of light carrying the final image are focused at or near optical infinity.

4. The system of claim 1 in which the multi-colored image comprises a first colored light and a second colored light each having a focal point in the intermediate image and the multiple substrates comprise a first curved surface having a focus that coincides with the focal point of the first colored light and a second curved surface having a focus that coincides with the focal point of the second colored light.

5. The system of claim 4 in which the multi-colored image further comprises a third colored light having a focal point in the intermediate image and the multiple substrates further comprise a third curved surface having a focus that coincides with the focal point of the third colored light.

6. The system of claim 1 in which the multi-colored image comprises green and red light and in which the multiple substrates comprise a first curved surface having a reflective coating that reflects the green light and a second curved surface having a reflective coating that reflects the red light.

7. The system of claim 6 in which the multi-colored image further comprises blue light and in which the multiple substrates further comprise a third curved surface having a reflective coating that reflects the blue light.

8. The system of claim 1 in which at least one of the reflective coatings comprises a reflective material taken from the group consisting essentially of a holographic recording material, a dielectric, and a thin film.

9. The system of claim 1 in which the lens is of a monochromatic or partly color corrected type.

* * * * *